United States Patent
Yao

(10) Patent No.: US 8,839,318 B2
(45) Date of Patent: Sep. 16, 2014

(54) APPARATUS, SYSTEMS AND METHODS FOR QUICK SPEED PRESENTATION OF MEDIA CONTENT

(75) Inventor: Kevin Yao, Cheyenne, WY (US)

(73) Assignee: EchoStar Broadcasting Corporation, Englewood, CO (US)

( * ) Notice: Subject to any disclaimer, the term of this patent is extended or adjusted under 35 U.S.C. 154(b) by 501 days.

(21) Appl. No.: 13/179,364

(22) Filed: Jul. 8, 2011

(65) Prior Publication Data

US 2012/0011552 A1 Jan. 12, 2012

Related U.S. Application Data

(60) Provisional application No. 61/362,452, filed on Jul. 8, 2010.

(51) Int. Cl.
*H04N 7/16* (2011.01)
*H04N 7/173* (2011.01)
*H04H 60/33* (2008.01)
*H04H 60/32* (2008.01)
*H04N 21/432* (2011.01)
*H04N 21/845* (2011.01)
*H04N 21/234* (2011.01)
*H04N 21/4147* (2011.01)

(52) U.S. Cl.
CPC ....... *H04N 21/8455* (2013.01); *H04N 21/4325* (2013.01); *H04N 21/23418* (2013.01); *H04N 21/4147* (2013.01)

USPC ........ 725/88; 725/9; 725/14; 725/19; 725/86; 725/87; 725/101; 725/102

(58) Field of Classification Search
None
See application file for complete search history.

(56) References Cited

U.S. PATENT DOCUMENTS

| | | | |
|---|---|---|---|
| 8,081,829 B2 * | 12/2011 | Aokage | 382/238 |
| 8,483,268 B1 * | 7/2013 | Alvarez et al. | 375/240.01 |
| 2001/0022891 A1 * | 9/2001 | Schultz et al. | 386/68 |
| 2002/0039481 A1 * | 4/2002 | Jun et al. | 386/68 |
| 2006/0023915 A1 * | 2/2006 | Aalbu et al. | 382/103 |
| 2006/0210157 A1 * | 9/2006 | Agnihotri et al. | 382/173 |
| 2008/0267026 A1 * | 10/2008 | Kamohara | 369/47.31 |
| 2010/0095320 A1 * | 4/2010 | Lee | 725/19 |

* cited by examiner

*Primary Examiner* — Justin Shepard
(74) *Attorney, Agent, or Firm* — Lowe Graham Jones PLLC

(57) ABSTRACT

Media content quick speed presentation systems and methods are operable to present selected portions of a media content stream at a quick speed presentation rate. An exemplary embodiment receives the media content stream; identifies a normal speed scene in the received media content, wherein the normal speed scene is presented at a normal speed presentation rate; and identifies a quick speed scene in the received media content, wherein the quick speed scene is presented at a quick speed presentation rate.

15 Claims, 2 Drawing Sheets

APPARATUS, SYSTEMS AND METHODS FOR QUICK SPEED PRESENTATION OF MEDIA CONTENT

CROSS REFERENCE TO RELATED APPLICATIONS

This application claims the benefit of and priority to co-pending U.S. utility application entitled, "Apparatus, Systems And Methods For Quick Speed Presentation Of Media Content," having application Ser. No. 61/362,452, filed Jul. 8, 2010, and which is entirely incorporated herein by reference.

BACKGROUND

Media devices, such as a set top box, are configured to receive media content. The received media content may be presented on a media presentation device, such as a television, computer system, monitor, or the like. The media content, such as a television program, a broadcast sports event, a movie, or the like, is received in the form of a video stream and an associated audio stream. Once received and processed, the video stream is presented on a display and the audio stream is output from one or more speakers in a synchronized fashion.

At times, the user may not be interested in all portions of the presented media content. For example, the periods between plays of a baseball game, football game, hockey match, tennis match, golfing tournament or the like may not be of high interest to the user. As another example, opening credit scenes of a movie or television program may be uninteresting to the user. In other situations, an action scene may be uninteresting to the user when the user is primarily interested in the dialogue of the program (or vice-versa). So long as the presented media content has been suitably buffered, stored, provided on demand, or retrieved from a memory media, the user may elect to fast forward through the portions of the media content that are not of high interest.

Fast forwarding through the presented media content poses many problems and inconveniences. One issue is that the user must visually monitor the progress of the fast forward presentation so that normal speed presentation can resume when the uninteresting portion of the media content has passed. If the user fails to notice the conclusion of the uninteresting portion of the media content, and/or fails to act sufficiently fast enough to return to the normal speed presentation rate, the media content will have to be rewound back to the conclusion of the uninteresting portion of the media content. This process can be cumbersome and annoying to the user, especially if the user repeatedly overshoots the conclusion of the uninteresting portion of the media content, and then overshoots or undershoots the rewinding back to the conclusion of the uninteresting portion of the media content.

Further, when the uninteresting portion of the media content is being presented in the fast forward mode, audio information is not typically presented. Even if the audio information is presented, the speed of the fast forward presentation (typically four times to eight times normal presentation speed) is such that the audio portion is unintelligible to the user. That is, the user cannot meaningfully discern any of the audio content.

Accordingly, there is a need in the arts to permit the user to more conveniently advance through presentation of the uninteresting portions of media content.

SUMMARY

Systems and methods of presenting selected portions of a media content stream at a quick speed presentation rate are disclosed. An exemplary embodiment receives the media content stream; identifies a normal speed scene in the received media content, wherein the normal speed scene is presented at a normal speed presentation rate; and identifies a quick speed scene in the received media content, wherein the quick speed scene is presented at a quick speed presentation rate.

Another exemplary embodiment receives a media content stream at a media device, the media content stream comprising at least a video stream portion and an audio stream portion; monitors at least one characteristic of the media content stream to identify at least one of a normal speed scene and a quick speed scene in the received media content stream; communicates the video stream portion of the normal speed scene to a display for presentation at a normal speed presentation rate; and communicates the video stream portion of the quick speed scene to the display for presentation at a quick speed presentation rate.

BRIEF DESCRIPTION OF THE DRAWINGS

Preferred and alternative embodiments are described in detail below with reference to the following drawings.

DETAILED DESCRIPTION

Figure 1:
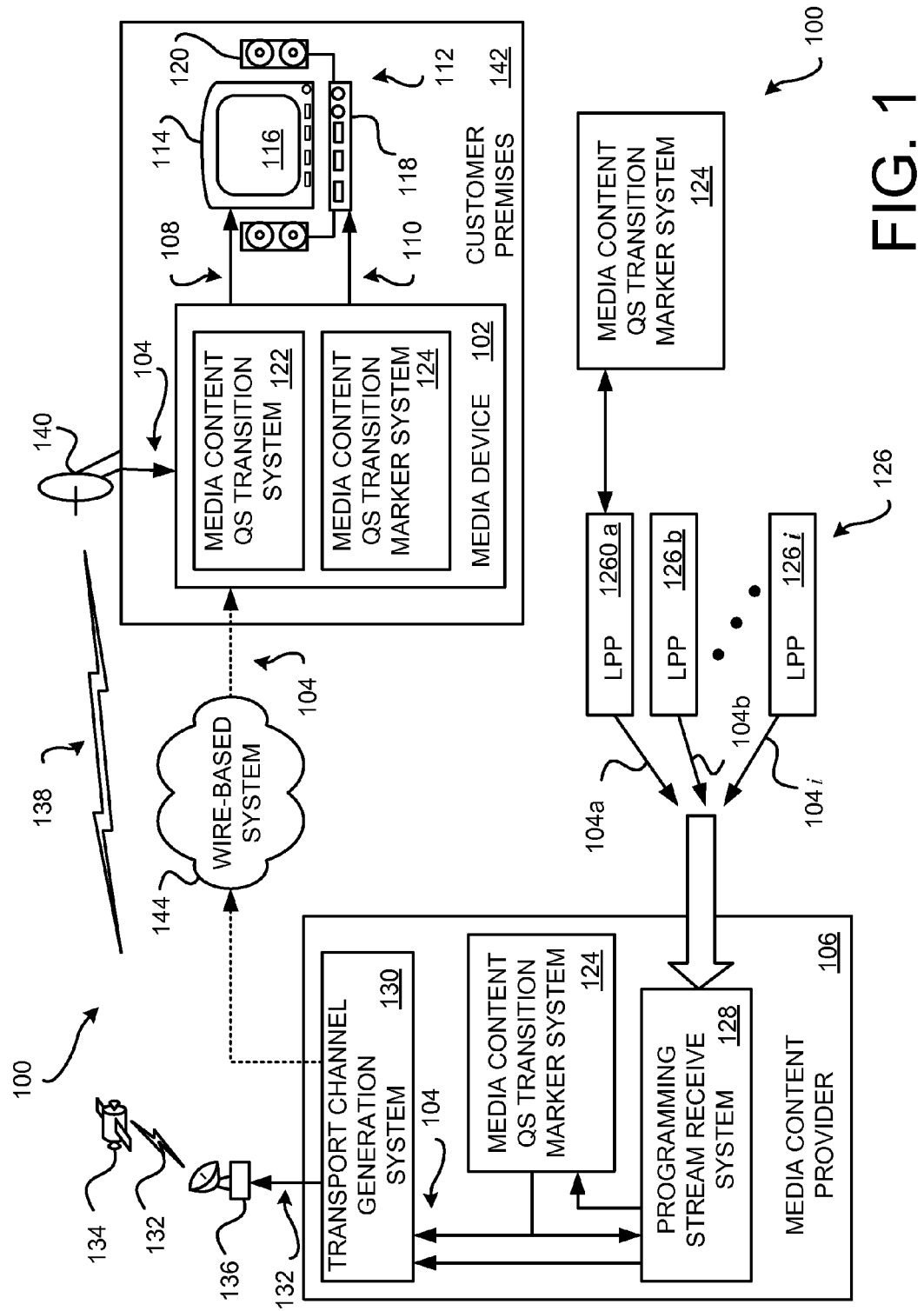
FIG. 1 is a block diagram of an embodiment of a quick speed media content system.

FIG. 1 is a block diagram of an embodiment of a quick speed media content system 100. In this exemplary embodiment, the quick speed media content system 100 is implemented in a media device 102, such as, but not limited to, a set top box (STB). Embodiments of the quick speed media content system 100 may be implemented in other media devices, such as, but not limited to, televisions (TVs), digital video disc (DVD) players, digital video recorders (DVRs), game playing devices, and/or personal computers (PCs) that are configured to receive and present visual and audio media content. Embodiments of the quick speed media content system 100 may also be implemented in other locations in a media content transport system where the media content is available for processing.

The media device 102 receives at least one media content stream 104 that is provided from a media content provider 106. The media content stream 104 comprises a video stream 108 and an audio stream 110 which may be presented on one or more suitable presentation devices 112. Presentation of the video stream 108 and the audio stream 110 are synchronized with each other. For example, the illustrated media device 102 is communicatively coupled to a television 114 that presents the video stream on its display 116 (and optionally, may also present the audio stream on its speakers). Alternatively, or additionally, the media device 102 may be communicatively coupled to a sound system 118 that emits the audio stream 106 on its speakers 120. Examples of the sound system 118 include, but are not limited to, a surround sound system, an audio amplifier, a stereo, or the like.

An exemplary embodiment of the quick speed media content system 100 implemented in a media device 102 comprises a media content quick speed (QS) transition system 122 and an optional media content quick speed (QS) transition marker system 124. During presentation of the media content stream 104, portions of the media content stream 104 may be relatively uninteresting to the user. That is, the user may not wish to view presentation of selected portions of the media content stream 104.

Embodiments of the media content QS transition system 122 monitor at least one characteristic of the media content stream, such as a characteristic of the video stream 108 and the audio stream 110, to identify portions of the media content stream 104 that may be defined as a normal speed scene (and thus, is presumed to be relatively interesting to the user), and that may be defined as a quick speed scene (and thus, is presumed to be relatively uninteresting to the user). The normal speed scenes are presented at the designed presentation speed for the media content stream 104. That is the frame rate presentation rate is the same as, or is substantially the same as, the rate at which image frames were captured by the video cameras during the filming of the scene. Accordingly, the normal speed scenes are presented in real time to the viewer.

The quick speed scenes are presented at a relatively faster presentation speed so that the quick speed scene is presented in less time than a comparable length normal speed scene. That is the frame rate presentation rate is higher than the rate at which image frames were captured by the video cameras during the filming of the scene. Accordingly, during presentation of a quick speed scene, the user may view the video stream 108, and optionally hear the audio stream 110, over a relatively shorter duration.

The quick speed scene is presented at a speed that is substantially less than a presentation speed during typical fast forward operation. For example, but not limited to, a fast forward speed presentation rate may be at eight times (8×) or four times (4×) the rate of the normal presentation speed of the media content stream 104. Further, during fast forward presentation, the audio stream 110 is typically not presented. Or, if the audio stream 110 is presented, the audio stream 110 is not intelligible to the user because of the fast forward presentation speed.

In contrast, in an exemplary embodiment, the video stream 108 of the quick speed scene is presented at two times (2×) speed. In another embodiment, the quick speed scene is presented at one-and-a-half times (1.5×) speed. Thus, the user is able to view the quick speed scene at a quick speed presentation rate that is relatively faster than a normal presentation speed rate, but at a rate that is substantially less than a typical fast forward speed presentation rate. Any suitable quick speed presentation rate may be used by the various embodiments, wherein the quick speed presentation rate permits meaningful viewing by the user.

Optionally, the audio stream 110 may be optionally presented at the quick speed presentation rate. Since the quick speed presentation rate is relatively slow (as compared to a fast forward speed presentation rate), the user is able to meaningfully discern the audio stream 110 as it is presented for the quick speed scene. That is, the user is generally able to understand the dialogue of the audio stream 110 and is able to understand other sounds, such as music, background effect sounds, and the like, of the audio stream 110. It is appreciated that accelerating presentation of a video stream 108 may result in some level of pitch distortion (the "chipmunk" effect). Some embodiments may be configured to adjust pitch of or otherwise modulate the presented audio stream 110 during a quick speed scene to improve and/or enhance the sound quality. For example, but not limited to, the pitch of the presented audio stream 110 of a quick speed scene may be lowered. In various embodiments, any suitable quick speed presentation rate may be selected, wherein the quick speed presentation rate permits meaningful hearing by the user.

Embodiments of the quick speed media content system 100 are configured to detect normal speed scenes and quick speed scenes, and/or detect transitions between the normal speed scene and the quick speed scene (and vice-versa), using one or more processes. When an occurrence of the quick speed scene is detected, and/or a transition is detected from a normal speed scene to a quick speed scene, the presentation speed rate is increased to the quick speed presentation rate. Accordingly, the quick speed scene is presented at the quick speed presentation rate.

When an occurrence of the normal speed scene is detected, and/or a transition is detected from a quick speed scene to a normal speed scene, the presentation speed is returned to the normal speed presentation rate. Accordingly, the normal speed scene is presented at the normal speed presentation rate.

To facilitate disclosure of an exemplary embodiment of the quick speed media content system 100, operation of an exemplary media content transport system that provides media content to the media device 102 is disclosed. The media content provider 106 receives media content from a plurality of local program providers (LPPs) 126 or other content providers. The provided media content may include, but is not limited to, a television program, a newscast, a broadcast sports event, a movie, or the like. The media content is typically provided in the form of a media content stream 104 that includes the video stream 108 and the synchronized audio stream 110. For example, the LPP 126a may be broadcasting a movie in the media content stream 104a. As another example, the LPP 126b may be a sports station or the like that is filming a sporting event, such as a football game or the like, that is provided in its media content stream 104b.

The media content provider 110 receives the various received media content streams 104a-104i from many different LPPs 126, even thousands of different LPPs 126, at its programming stream receive system 128. The programming stream receive system 128 processes the received media content streams 104a-104i as necessary to prepare them for transmission to the customers. For example, commercials or the like may be incorporated with a particular one of the media content streams 104a-104i. Alternatively, or additionally, the media content streams 104a-104i may be associated with identifiers, such as channel number and/or station call signs.

In an exemplary media content transport system, the processed media content streams 104a-104i are communicated from the programming stream receive system 128 to the transport channel generation system 130. The transport channel generation system 130 bundles selected ones of the media content streams 104a-104i into one or more transport channels 132.

Then, one or more of the transport channels 132 are uplinked to a satellite 134, via a corresponding transmit antenna 136. The respective transport channels 132 are then communicated, in the form of a wireless signal 138, from the satellite 134 down to a receiver antenna 140 located at the customer premises 142. The received wireless signal 138 with the transport channel(s) 132 therein is then communicated from the receiver antenna 140 to the media device 102. The receiver antenna 140 and the media device 102 may be configured to receive multiple transport channels 138 from a plurality of satellites 134.

A program of interest corresponding to the presented media content stream 104 may be selected by the user who provides suitable instructions to the media device 102. The program of interest may be identified by its particular "channel" and/or station call sign. The media device 102 tunes itself to the particular transport channel 132 on which the program of interest is available, and then retrieves the selected program of interest. The program of interest is then assembled into the video stream 108 and the audio stream 110, which are then communicated from the media device 102 to the media presentation device(s) 112.

Alternatively, or additionally, the media content stream 104 may be provided to the media device 102 over other systems. For example, but not limited to, the media content system provider 110 may communicate a plurality of media content streams 104 over a wire-based system 144. The wire-based system 144 may use fiber optic cables, coaxial cable, and/or another connector that couples the media device 102 to the wire-based system 144. Further, the wire-based system 144 may employ other communication medium to facilitate delivery of media content to the media device 102.

As another non-limiting example, the media content stream 104 may be delivered over the Internet (not shown) to the media device 102. Accordingly, the media device 102 may receive the content from a router using a wire-based medium or a wireless medium. Or, the media device 102 may have a modem or the like therein that is configured to enable connectivity to the Internet.

An exemplary embodiment of the media content QS transition system 122 is configured to detect whether the currently presented scene is a normal speed scene or a quick speed scene. Detection of the scene type (normal speed scene or quick speed scene) may be based on analyzed characteristics of the media content stream 104. That is, characteristics of the video stream 108, the audio stream 110, the metadata stream, and/or other suitable information in the media content stream 104, may be analyzed to determine whether the currently presented scene is a normal speed scene or a quick speed scene.

In an exemplary embodiment, content of an image frame of the video stream 108 is analyzed to identify image characteristics of that frame. An absence or presence of, and/or the quantity of, a particular type of image characteristic may be used to identify the scene type. Examples of image characteristics that may be analyzed include, but are not limited to, bit number, bit depth, color palette, color balancing, and/or degree of noise reduction. Edge analysis and/or motion vector analysis may be performed on an image to identify edge and/or motion vector characteristics of the objects in the image. Alternatively, or additionally, a series of multiple image frames may be analyzed and compared to improve the reliability of the determination of the scene type. Any suitable image characteristic may be analyzed to determine the scene type.

For example, a relatively large number of a particular monitored characteristic may indicate a scene type. For example, the number of edges and/or motion vectors of a image frame may be determined. A scene and/or a series of scenes having a large number of edges in one image frame, or a large number of moving edges in a series of image frames, may tend to indicate that the scene type has a relatively large amount of activity (a high activity frame). Additionally, or alternatively, a scene and/or a series of scenes having a large number of motion vectors in one image frame, or in a series of image frames, may tend to indicate that the scene type has a relatively large amount of activity. A series of scenes having moving edges and/or motion vectors that move a relatively long distance across the field of a series of image frames may also tend to indicate that the scene type has a relatively large amount of activity. Alternatively, a scene and/or a series of scenes having few edges or motion vectors, or a series of scenes having moving edges and/or motion vector that move a relatively short distance, may tend to indicate that the scene type has a relatively low amount of activity (a low activity frame).

In an exemplary embodiment, when the number of moving edges and/or motion vectors in an analyzed image, and/or a series of images, exceeds a predefined threshold, the scene may be identified as a high activity scene. Additionally, or alternatively, when the distance of the move of the edges and/or motion vectors in a series of images exceeds a predefined threshold, the scene may be identified as a high activity scene. Alternatively, when the number of moving edges and/or motion vectors in an analyzed image, and/or a series of images, is less than a predefined threshold, the scene may be identified as a low activity scene. Additionally, or alternatively, when the distance of the move of the edges and/or motion vectors in a series of images is less than a predefined threshold, the scene may be identified as a low activity scene.

Embodiments are configured to identify a scene as being a normal speed scene or a quick speed scene based on the determined level of activity. For example, when the media content event is a sporting event, scenes having a large number of moving edges, having a large number of motion vectors, and/or having large movement in motion vectors, may be identified as scenes of interest that should be presented at the normal speed presentation rate. On the other hand, when the media content event is a romance movie, scenes having a large number of moving edges, having a large number of motion vectors, and/or having large movement in motion vectors, the viewer may prefer to have those scenes presented at the quick speed presentation rate.

To illustrate, an analysis of a football game based on edge analysis (and/or motion vector analysis) may result in identifying game play scenes as having a relatively large number of moving edges (and/or motion vectors) and/or that have edges (and/or motion vectors) that move a relatively long distance across the field of the image frame. If the user is mostly interested in viewing actual game plays (and not the periods between actual game play, like the huddles and/or commentary), then these scenes would be identified as normal speed scenes. On the other hand, scenes characterized by relatively few moving edges (and/or motion vectors), and/or that have edges (and/or motion vectors) that move a relatively short distance across the field of the image frame, may be determined to be the periods between actual game play, like the huddles and/or commentary. Accordingly, these scenes may be identified as quick speed scenes. As presentation of the football game is underway, the normal speed scenes associated with actual game play are presented at the normal speed presentation rate. The quick speed scenes associated with periods between the game play is presented at the quick speed presentation rate. It is appreciated that the user will still be able meaningfully view the video of the quick speed scenes, and optionally, meaningfully hear the audio of the quick speed scene, when the quick speed scene is presented at the quick speed presentation rate.

To further illustrate, on the other hand, an analysis of a "kung-fu" action film may also be based on a suitable edge analysis (and/or motion vector analysis process). However, the user may be more interested in the story line of the film and may be less interested in the choreographed fighting scenes. Accordingly, scenes characterized by relatively few moving edges (and/or motion vectors), and/or that have edges (and/or motion vectors) that move a relatively short distance across the field of the image frame, may be determined to be associated with dialogue related to the story line, and accordingly, be defined as normal speed scenes. Scenes characterized by a relatively large number of moving edges (and/or motion vectors), and/or that have edges (and/or motion vectors) that move a relatively long distance across the field of the image frame, may be determined to be the choreographed fighting scenes, and accordingly, be defined as quick speed scenes.

In an exemplary embodiment, content of a frame of the audio stream 110 may be analyzed (monitored) to identify sound characteristics of that frame or series of frames. An absence or presence of, and/or the quantity of, a particular type of sound characteristic may be used to identify the scene type. Examples of image characteristics that may be analyzed include, but are not limited to, volume, pitch, frequency, or the like. For example, an explosion sound may tend to indicate that the scene may be associated with a lot of activity. In contrast, dialogue may tend to indicate that the scene may be associated with a conversation related to the story line. Any suitable sound characteristic may be analyzed to identify the scene type. Analysis of the audio stream 110 may used alone, or in conjunction with, analysis of the video stream 108.

In an exemplary embodiment, relatively large changes in the analyzed characteristics of the video stream 108 and/or the audio stream 110 may be used to detect (monitor) a transition between normal speed scenes and quick speed scenes. In an exemplary embodiment, the presentation speed of the currently presented scene may be alternated between the normal speed presentation rate and the quick speed presentation rate upon detection of the transition. Alternatively, detection of the transition may be used to conjunction with analysis of other analyzed characteristics of the video stream 108 and/or the audio stream 110 to identify whether the currently presented scene is a normal speed scene or a quick speed scene.

Alternatively, or additionally, embodiments of the media content QS transition system 122 may be configured to detect (monitor) an occurrence of a scene transition marker. In an exemplary embodiment, the scene transition marker denotes the transition between the normal speed scene and the quick speed scene (and vice-versa). Alternatively, or additionally, the scene transition marker may be used to identify whether the currently presented scene is a normal speed scene or a quick speed scene.

The scene transition marker may be any suitable identifier, trigger, information, or the like, that is incorporated into the media content stream 104 by the media content QS transition marker system 124. A scene transition marker may be incorporated into at least one of the video stream 108, the audio stream 110, a metadata stream associated with the media content stream 104, and/or another suitable location in the media content stream 104.

For example, but not limited to, the scene may be identified as a quick speed scene in response to detecting the occurrence of the scene transition marker when the previous scene was a normal speed scene. Then, a subsequent scene may be identified as a normal speed scene in response to detecting the next occurrence of the scene transition marker (since the previous scene was a quick speed scene).

In an exemplary embodiment, the scene transition marker may be a bit flag or the like to identify whether the currently presented scene is a normal speed scene or a quick speed scene. Detecting (monitoring) a bit flag causes the media content QS transition system 122 to initiate a change in the presentation speed rate. In another embodiment, the scene transition marker may include suitable metadata descriptor that is used to indicate the transition between the normal speed scene and the quick speed scene (and vice-versa), and/or that is used to indicate the scene type. A first value of the bit flag may be associated with the normal speed presentation rate, and the second value or the bit flag may be associated with the quick speed presentation rate. The bit flag may be located any suitable part of the media content stream. In an exemplary embodiment, the bit flag may be located in a predefined location in a header and/or footer of the data file of an image frame. Alternatively, or additionally, the bit flag may be located in a predefined location in the audio portion and/or the metadata portion of the media content stream.

In some embodiments, the metadata descriptor may be dedicated metadata information that may be used to identify whether the currently presented scene is a normal speed scene or a quick speed scene. The metadata descriptor may identify (monitor) the transition between the normal speed scene and the quick speed scene (and vice-versa). Alternatively, the metadata descriptor may be metadata information that describes other characteristics of the currently presented scene. For example, in an exemplary embodiment, the metadata descriptor for a scene may be included under the moving picture experts group multimedia content description standard (MPEG-7). MPEG-7 scene descriptors may be used for a variety of purposes unrelated to the embodiments described herein. However, embodiments of the quick speed media content system 100 may be configured to analyze such MPEG-7 scene descriptors, or other types of scene descriptors used by other formats, to identify the transition between the normal speed scene and the quick speed scene (and vice-versa). Further, an optional scene transition marker may be added into the media content stream 104 by the media content QS transition marker system 124 to facilitate detection of scene transitions by the media content QS transition system 122.

Alternatively, or additionally, the MPEG-7 scene descriptors, or other types of scene descriptors used by other formats, may be used to determine (monitor) if the currently presented scene is a normal speed scene or a quick speed scene. In an exemplary embodiment, the media content QS transition system 122 and/or the media content QS transition marker system 124 are configured to perform a key word search of the MPEG-7 scene descriptors or the other types of scene descriptors used by alternative formats. Certain key words may be associated with a normal speed scene or a quick speed scene. Based on the occurrence of such key words, embodiments may then identify scene transitions, and thereby optionally add a scene transition marker, and/or determine that the currently presented scene is a normal speed scene or a quick speed scene. If multiple key words are identified, then a weighting system may be used where some key words have greater weighting that other key words. Alternatively, or additionally, the number of key words (weighted or unweighted) associated with a normal speed scene may be compared with the number of key words (weighted or unweighted) associated with a quick speed scene.

In some embodiments, scene transition markers are incorporated into the media content stream 104 by a human operator. The operator is aware of the nature of the programming being presented by the media content stream 104. Further, the operator also understands, based upon predefined instructions or other criteria, the scene type of the current scene. That is, the operator intuitively understands which scenes are likely to be a normal speed scene or a quick speed scene. The operator, in such applications, accesses an embodiment of media content QS transition marker system 124 to add a suitable marker into the media content stream 104 in accordance with the operator's instructions. For example, a button or suitable controller may be provided for the operator to actuate to cause a scene transition marker to be incorporated into the media content stream 104. Alternatively, or additionally, a suitable interface may be available to the operator so that a suitable metadata descriptor may be incorporated into the media content stream 104. A first signal received from the operator actuated controller may be associated with the transition marker identifying a normal speed scene. A second signal received from the operator actuated controller may be associated with the transition marker identifying a quick speed scene.

In the various embodiments of the quick speed media content system 100, the media content QS transition marker system 124 may be located at any suitable place within the media content transport system and/or at the customer premises 142. Multiple media content QS transition marker systems 124 may be used.

In some embodiments, the media content QS transition marker system 124 may be communicatively coupled to, or may be integrated into, the media device 102. In such embodiments, the received media content stream 104 is analyzed at the media device 102. Scene transition markers are incorporated into the media content stream 104 based upon the determination of a change in the currently presented scene type and/or upon an identification of the scene type.

Alternatively, or additionally, an embodiment of the media content QS transition marker system 124 may be communicatively coupled to, or may be integrated into, one or more of the LPPs 126. The media content QS transition marker system 124 is used to incorporate scene transition markers into the media content stream 104 as the LPP 126 is generating and/or processing a particular media content stream 104. The scene transition markers may be generated automatically based on analyzed characteristics of the media content stream 104, and/or may be manually generated by an operator.

For example, a camera operator filming a sporting event or the like, may use a media content QS transition marker system 124 to incorporate scene transition markers into the media content stream 104 as the camera operator is filming. Alternatively, or additionally, a media content QS transition marker system 124 at the media control center that is integrating a plurality of media content streams 104 received from a plurality of different cameras filming the sporting event may incorporate scene transition markers into the media content stream 104 as the different received media content streams 104 are integrated into a single, cohesive media content stream 104 representing the sporting event. Alternatively, or additionally, the LPP 126 may use the media content QS transition marker system 124 to incorporate scene transition markers into the media content stream 104 as the media content stream 104 is further processed to add commercials or the like.

Alternatively, or additionally, an embodiment of the media content QS transition marker system 124 may be communicatively coupled to the programming stream receive system 128 and/or the transport channel generation system 130. As the programming stream receive system 128 and/or the transport channel generation system 130 is processing a particular media content stream 104, the media content QS transition marker system 124 may be used to incorporate the scene transition markers into the media content stream 104. For example, the media content QS transition marker system 124 may be used to incorporate scene transition markers into the media content stream 104 as the media content stream 104 is processed to add commercials or the like. Alternatively, or additionally, the media content QS transition marker system 124 may be used to incorporate scene transition markers into the media content stream 104 as the media content stream 104 is processed to generate the transport channels 132.

Figure 2:
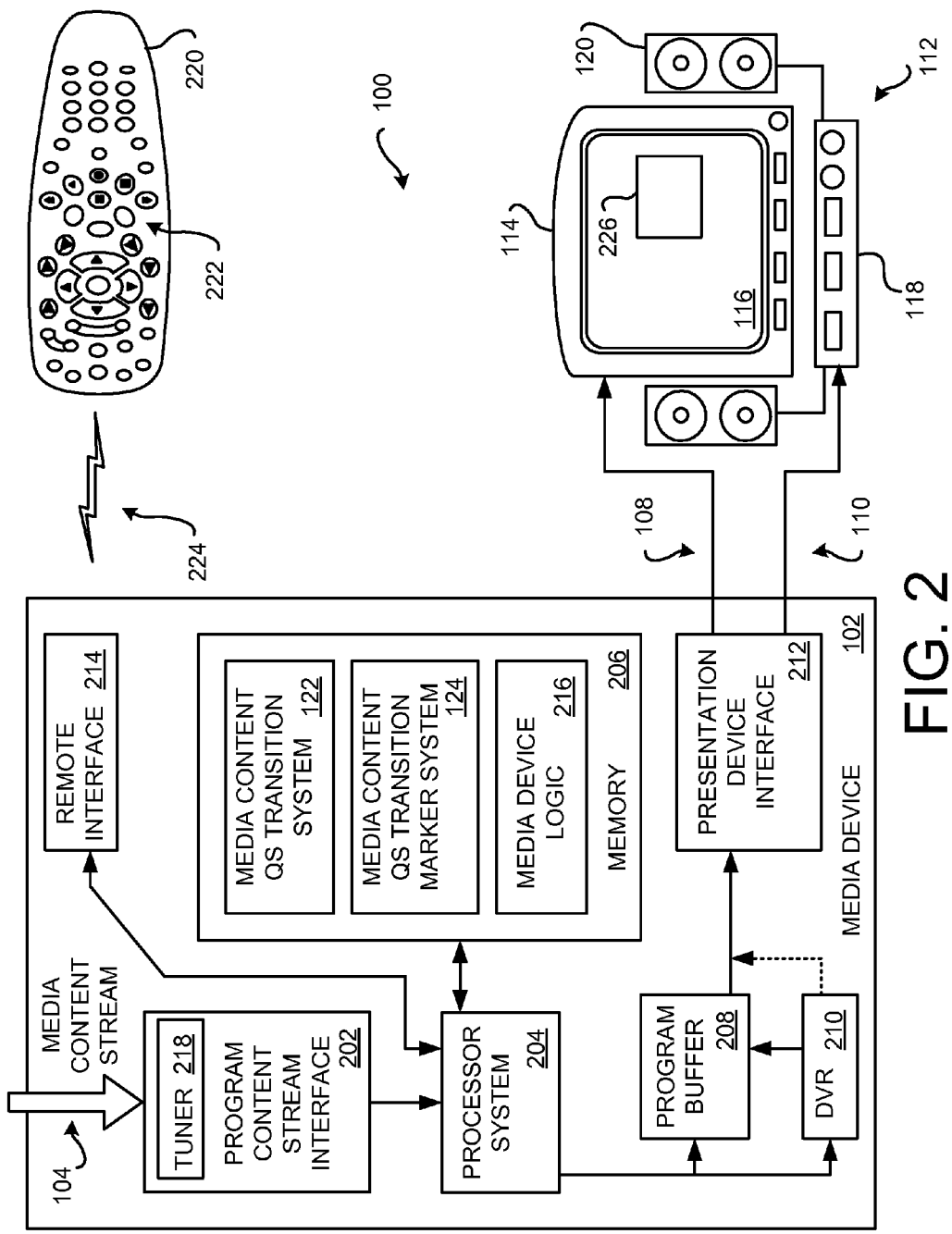
FIG. 2 is a block diagram of an embodiment of an exemplary media device.

FIG. 2 is a block diagram of an embodiment of an exemplary media device 102. The non-limiting exemplary media device 102 comprises a program content stream interface 202, a processor system 204, a memory 206, a program buffer 208, an optional digital video recorder (DVR) 210, a presentation device interface 212, and an optional remote interface 214.

In this exemplary embodiment, the media content QS transition system 122 and the optional media content QS transition marker system 124 are implemented as software logic. Accordingly, the memory 206 comprises portions for storing the media device logic 216, the media content QS transition system 122, and the media content QS transition marker system 124. In some embodiments, the media device logic 216, the media content QS transition system 122, and the media content QS transition marker system 124 may be integrated together, and/or may be integrated with other logic. Alternatively, the media device logic 216, the media content QS transition system 122, and the media content QS transition marker system 124 may be implemented as firmware, or a combination of software and firmware.

Other media devices 102 may include some, or may omit some, of the above-described media processing components. Further, additional components not described herein may be included in alternative embodiments.

The functionality of the media device 102, here a set top box, is now broadly described. A media content provider provides the media content stream 104 that is received by the program content stream interface 202. One or more optional tuners 218 in the program content stream interface 202 selectively tune to a selected media content stream 104 in accordance with instructions received from the processor system 204. The processor system 204, executing the media device logic 216 and based upon a request for a program of interest specified by the user, parses out program content associated with the program of interest. The program of interest is then assembled into the video stream 108 and the audio stream 110, which are then stored by the program buffer 208. After buffering, the program content can be streamed out to the media presentation devices 112, such as the television 114, via the presentation device interface 212. Alternatively, or additionally, the parsed out program content may be saved into the DVR 210 for later presentation. In alternative embodiments, the media content stream 104 may stored in an alternative storage medium.

The exemplary media device 102 is configured to receive commands from the user via a remote control 220. The remote control 220 includes one or more controllers 222. The user, by actuating one or more of the controllers 222, causes the remote control 220 to generate and transmit commands, via a wireless signal 224, to the remote interface 214. The commands control the media device 102 and/or control the media presentation devices 112. The wireless signal 224 may be an infrared signal or an RF signal.

In practice, the media content stream 104 needs to be buffered and/or saved such that a sufficient duration of media content is available for presenting the quick speed scenes at the quick speed presentation rate. That is, if the media content stream 104 is being received and presented on a real time basis, embodiments will not be able to present the quick speed scenes at the quick speed presentation rate since the media content stream 104 is being received in real time.

In one application, the media content stream 104 is transmitted by some predefined duration ahead of presentation to the user. Thus, when the user is presented the media content stream 104, a sufficient duration of media content is available for presenting the quick speed scenes at the quick speed presentation rate. The predefined duration, in an exemplary embodiment, corresponds to a difference between the duration of the media content stream 104 presented entirely at the normal speed presentation rate and the duration of the media content stream 104 when the quick speed scenes are presented at the quick speed presentation rate. However, any suitable predetermined duration may be used.

In another application, the media content stream 104 is processed and saved into the DVR 210 (or another media storage device). The scene transition markers may be added prior to storage of the media content stream 104. Alternatively, or additionally, scene transition markers may be added when the media content stream 104 is retrieved from storage for presentation. Alternatively, or additionally, transitions between the normal speed scenes and the quick speed scenes may be determined on a real time basis, or near real time basis, as the media content stream 104 is retrieved from storage for presentation.

In another application, the media content stream 104 is received from a video on demand (VOD) system (not shown) or other another media storage device that is configured to be controlled by the media device 102 and/or the user. The scene transition markers may be added prior to storage of the media content stream 104. Alternatively, or additionally, scene transition markers may be added when the media content stream 104 is retrieved from the VOD system or other media storage device. Alternatively, or additionally, transitions between the normal speed scenes and the quick speed scenes may be determined on a real time basis, or near real time basis, as the media content stream 104 is retrieved from storage for presentation.

When the quick speed scene is presented at the quick speed presentation rate, the media content stream 104 is retrieved from the DVR 210, the VOD system, or other media storage device, at a rate that corresponds to at least the quick speed presentation rate. In another embodiment, the media content stream 104 is retrieved from the DVR 210, the VOD system, or other media storage device, and is then buffered, prior to presentation to the user. In this implementation, the user may have to wait some duration prior to initiation of presentation of the media content stream 104 that is retrieved from the DVR 210, the VOD system, or other media storage device.

In practice, presentation of the quick speed scenes at the quick speed presentation rate is selectable by the user. That is, the user may opt in to have quick speed scenes presented at the quick speed presentation rate, referred to as a quick speed scene presentation mode. Alternatively, the user may opt out such that the quick speed scenes are presented at the normal speed presentation rate, referred to as a normal speed scene presentation mode.

Further, the user may elect to opt in or opt out of the quick speed scene presentation mode at any point during presentation of the media content stream 104. That is, the user may elect to have future presented quick speed scenes presented at the quick speed presentation rate at any time. Similarly, at any point in presentation of the media content stream 104, the user may elect to opt out of the quick speed scene presentation mode.

Some media content streams 104 are initially provided to the media device 102 with scene transition markers incorporated into the media content stream 104. The scene transition markers may have been incorporated at any suitable point in the origination and/or processing of the media content stream 104. When the scene transition markers are present, an exemplary embodiments of the quick speed media content system 100 is configured to generate a quick speed graphic notification 226 that is presented to the user that indicates the availability of presentation of the media content stream 104 using the quick speed scene presentation mode.

In some embodiments, the quick speed graphic notification 226 may be a simple pop-up type of graphic or other suitable indicator. The user is then aware of the availability of the quick speed scene presentation mode. The user may actuate one or more of the controllers 222 on the remote control 220 to opt in or opt out of the quick speed scene presentation mode. That is, the remote interface 214 is configured to receive the wireless signal 224 transmitted from a remote control 220, wherein the wireless signal 224 corresponds to an instruction to operate the media device 102 in a quick speed scene presentation mode of operation. In some embodiments, no action by the user within some predetermined duration results in automatic selection of a default mode by the media device 102. The selected default mode may be to opt out of the quick speed scene presentation mode. Alternatively, the default mode may be to opt into the quick speed scene presentation mode.

In some embodiments, the media device 102 may permit the user to enter into a menu system and select the quick speed scene presentation mode in a manner that is the same or similar to other user selectable options. After selection, the media device 102 operates in the selected presentation mode until otherwise changed by the user.

Alternatively, or additionally, the quick speed graphic notification 226 may be a graphical user interface (GUI). The GUI type may present selectable options to the user. For example, an opt in and/or an opt out choice may be presented to the user.

Alternatively, or additionally, a GUI type of quick speed graphic notification 226 may allow the user to define a presentation speed rate of interest for the quick speed presentation rate. For example, the user may wish to have a faster quick speed presentation rate for a sporting event and a relatively slower quick speed presentation rate for a movie. The user may be permitted to specify a numerical value for the quick speed presentation rate, and/or may be presented a group of quick speed presentation rates to select from.

In some embodiments, commercials, advertisements and/or other scenes not related to the subject matter of the presented media content stream 104 may be designated as quick speed scenes. Further, the quick speed presentation rate for these types of scenes may be different than the quick speed presentation rate of the quick speed scenes of the presented subject matter in the media content stream 104. For example, commercials may be presented at a relatively higher quick speed presentation rate that other quick speed scenes. In some embodiments, the commercials, advertisements and/or other scenes not related to the subject matter of the presented media content stream 104 may be blocked from being designated as quick speed scenes. Accordingly, such blocked scenes would be presented at the normal speed presentation rate.

It should be emphasized that the above-described embodiments of the quick speed media content system 100 are merely possible examples of implementations of the invention. Many variations and modifications may be made to the above-described embodiments. All such modifications and variations are intended to be included herein within the scope of this disclosure and protected by the following claims.

The invention claimed is:
1. A method comprising:
receiving a media content stream at a media device, the media content stream comprising at least a video stream portion and an audio stream portion;

monitoring at least one characteristic of the media content stream to identify at least one of a normal speed scene and a quick speed scene in the received media content stream;

communicating the video stream portion of the normal speed scene to a display for presentation at a normal speed presentation rate; and communicating the video stream portion of the quick speed scene to the display for presentation at a quick speed presentation rate, wherein monitoring the media content stream to identify at least one of the normal speed scene and the quick speed scene in the received media content stream comprises:

determining a number of edges in an image frame;

identifying a scene as the normal speed scene when the determined number of edges in the image frame exceeds a predefined threshold; and identifying the scene as the quick speed scene when the determined number of edges in the image frame is less than the predefined threshold.

2. The method of claim 1, wherein the quick speed presentation rate is greater than the normal speed presentation rate, and wherein the quick speed presentation rate is less than a fast forward speed presentation rate.

3. The method of claim 1, wherein the quick speed presentation rate is between one-and-a-half times (1.5×) the normal speed presentation rate and two times (2×) the normal speed presentation rate.

4. The method of claim 1, wherein a user viewing the quick speed scene may meaningfully discern video content and audio content the of the quick speed scene.

5. The method of claim 1, wherein a user selectable mode of operation provides for operation in a first mode and a second mode, wherein during operation in the first mode, the scene is identified as the normal speed scene when the determined number of edges in the image frame exceeds the predefined threshold, and the scene is identified as the quick speed scene when the determined number of edges in the image frame is less than the predefined threshold, and wherein during operation in the second mode, the monitoring of the media content stream to identify at least one of the normal speed scene and the quick speed scene in the received media content stream comprises:

determining the number of edges in the image frame;

identifying the scene as the quick speed scene when the determined number of edges in the image frame exceeds the predefined threshold; and identifying the scene as the normal speed scene when the determined number of edges in the image frame is less than the predefined threshold.

6. The method of claim 1, wherein communicating the video stream portion and the audio stream portion to the display for presentation at the quick speed presentation rate comprises:

communicating the audio stream portion at a same rate as the quick speed presentation rate of the quick speed scene when the quick speed scene is presented on the display; and reducing a pitch of the audio stream portion when presented with the quick speed scene.

7. A method comprising:

receiving a media content stream at a media device, the media content stream comprising at least a video stream portion and an audio stream portion;

monitoring at least one characteristic of the media content stream to identify at least one of a normal speed scene and a quick speed scene in the received media content stream;

communicating the video stream portion of the normal speed scene to a display for presentation at a normal speed presentation rate; and communicating the video stream portion of the quick speed scene to the display for presentation at a quick speed presentation rate, wherein monitoring the media content stream to identify at least one of the normal speed scene and the quick speed scene in the received media content stream comprises:

determining a number of motion vectors in an image frame;

identifying a scene as the quick speed scene when the determined number of motion vectors in the image frame exceeds a predefined threshold; and identifying the scene as the normal speed scene when the determined number of motion vectors in the image frame is less than the predefined threshold.

8. The method of claim 7, wherein a user selectable mode of operation provides for operation in a first mode and a second mode, wherein during operation in the first mode, the scene is identified as the quick speed scene when the determined number of motion vectors in the image frame exceeds the predefined threshold, and the scene is identified as the normal speed scene when the determined number of motion vectors in the image frame is less than the predefined threshold, and wherein during operation in the second mode, the monitoring of the media content stream to identify at least one of the normal speed scene and the quick speed scene in the received media content stream comprises:

determining the number of motion vectors in the image frame;

identifying the scene as the normal speed scene when the determined number of motion vectors in the image frame exceeds the predefined threshold; and identifying the scene as the quick speed scene when the determined number of motion vectors in the image frame is less than the predefined threshold.

9. The method of claim 7, wherein communicating the video stream portion and the audio stream portion to the display for presentation at the quick speed presentation rate comprises:

communicating the audio stream portion at a same rate as the quick speed presentation rate of the quick speed scene when the quick speed scene is presented on the display; and reducing a pitch of the audio stream portion when presented with the quick speed scene.

10. A method comprising:

receiving a media content stream at a media device, the media content stream comprising at least a video stream portion and an audio stream portion;

monitoring at least one characteristic of the media content stream to identify at least one of a normal speed scene and a quick speed scene in the received media content stream;

communicating the video stream portion of the normal speed scene to a display for presentation at a normal speed presentation rate; and communicating the video stream portion of the quick speed scene to the display for presentation at a quick speed presentation rate, wherein monitoring the media content stream to identify at least one of the normal speed scene and the quick speed scene in the received media content stream comprises:
analyzing volume of the audio stream portion of the media content stream;
identifying a scene as the quick speed scene when the volume exceeds a predefined threshold; and
identifying the scene as the normal speed scene when the volume is less than the predefined threshold.

11. The method of claim 10,
wherein a user selectable mode of operation provides for operation in a first mode and a second mode,
wherein during operation in the first mode, the scene is identified as the quick speed scene when the volume exceeds the predefined threshold, and the scene is identified as the normal speed scene when the volume is less than the predefined threshold, and
wherein during operation in the second mode, the monitoring of the media content stream to identify at least one of the normal speed scene and the quick speed scene in the received media content stream comprises:
analyzing the volume of the audio stream portion of the media content stream;
identifying the scene as the normal speed scene when the volume exceeds the predefined threshold; and
identifying the scene as the quick speed scene when the volume is less than the predefined threshold.

12. The method of claim 10, wherein communicating the video stream portion and the audio stream portion to the display for presentation at the quick speed presentation rate comprises:
communicating the audio stream portion at a same rate as the quick speed presentation rate of the quick speed scene when the quick speed scene is presented on the display; and
reducing a pitch of the audio stream portion when presented with the quick speed scene.

13. A media device, comprising:
a program content stream interface configured to receive a media content stream with a program of interest therein;
a remote interface configured to receive a wireless signal transmitted from a remote control, wherein the wireless signal corresponds to an instruction to operate the media device in a quick speed scene presentation mode; and
a processor system communicatively coupled to the program content stream interface and the remote interface, and wherein the processor system when operating in the quick speed scene presentation mode is configured to:
monitor at least one of edges and motion vectors of a video frame of the media content stream to identify at least one of a normal speed scene and a quick speed scene in the received media content stream;
communicate a video stream portion of the normal speed scene to a display for presentation at a normal speed presentation rate; and
communicate the video stream portion of the quick speed scene to the display for presentation at a quick speed presentation rate,
wherein monitoring the edges of the media content stream to identify at least one of the normal speed scene and the quick speed scene in the received media content stream comprises:
determining a number of edges in an image frame;
identifying a scene as the normal speed scene when the determined number of edges in the image frame exceeds a predefined threshold; and
identifying the scene as the quick speed scene when the determined number of edges in the image frame is less than the predefined threshold, and
wherein monitoring the motion vectors of the media content stream to identify at least one of the normal speed scene and the quick speed scene in the received media content stream comprises:
determining a number of motion vectors in an image frame;
identifying the scene as the quick speed scene when the determined number of motion vectors in the image frame exceeds the predefined threshold; and
identifying the scene as the normal speed scene when the determined number of motion vectors in the image frame is less than the predefined threshold.

14. The media device of claim 13, wherein the processor system when operating in the quick speed scene presentation mode is further configured to:
reduce a pitch of an audio stream portion of the quick speed scene.

15. The media device of claim 13, wherein the wireless signal transmitted from the remote control is a first wireless signal, wherein the remote interface is further configured to receive a second wireless signal transmitted from the remote control that corresponds to an instruction to operate the media device in one of a user selectable first mode of operation and a user selectable second mode of operation,
wherein during operation in the user selectable first mode of operation, the scene is identified as the normal speed scene when the at least one of the determined number of edges and the determined number of motion vectors in the image frame exceeds the predefined threshold, and the scene is identified as the quick speed scene when the at least one of the determined number of edges and the determined number of motion vectors in the image frame is less than the predefined threshold, and
wherein during operation in the user selectable second mode of operation, the scene is identified as the normal speed scene when the at least one of the determined number of edges and the determined number of motion vectors in the image frame is less than the predefined threshold, and the scene is identified as the quick speed scene when the at least one of the determined number of edges and the determined number of motion vectors in the image frame exceeds the predefined threshold.

* * * * *